(12) United States Patent
White et al.

(10) Patent No.: US 7,363,646 B2
(45) Date of Patent: Apr. 22, 2008

(54) VIDEO ON DEMAND METHODS AND SYSTEMS

(75) Inventors: Christopher M. White, San Francisco, CA (US); Timo Bruck, Mountain View, CA (US); Lee S. Mighdoll, Seattle, WA (US); Phillip Y. Goldman, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 165 days.

(21) Appl. No.: 10/941,168

(22) Filed: Sep. 14, 2004

(65) Prior Publication Data

US 2005/0034162 A1 Feb. 10, 2005

Related U.S. Application Data

(60) Continuation of application No. 09/870,267, filed on May 29, 2001, which is a division of application No. 09/201,495, filed on Nov. 30, 1998, now Pat. No. 6,804,825.

(51) Int. Cl.
*H04N 7/173* (2006.01)

(52) U.S. Cl. ............................ 725/88; 725/87; 725/91; 725/94; 725/95

(58) Field of Classification Search ............ 725/87–90, 725/92, 94–95, 100, 102–103, 32, 36, 139, 725/131, 151, 42, 98, 58; 386/45, 1, 125–126; 360/7; 715/716–719
See application file for complete search history.

(56) References Cited

U.S. PATENT DOCUMENTS

| | | | |
|---|---|---|---|
| 4,305,131 A | 12/1981 | Best | |
| 4,766,581 A | 8/1988 | Korn et al. | |
| 4,788,675 A | 11/1988 | Jones et al. | |
| 4,873,584 A | 10/1989 | Hashimoto | |
| 4,947,244 A | 8/1990 | Fenwick et al. | |
| 5,075,771 A | 12/1991 | Hashimoto | |
| 5,282,028 A | 1/1994 | Johnson et al. | |
| 5,319,455 A | 6/1994 | Hoarty et al. | |
| 5,327,544 A | 7/1994 | Lee et al. | |
| 5,371,551 A | 12/1994 | Logan et al. | |
| 5,410,343 A * | 4/1995 | Coddington et al. | ......... 725/99 |
| 5,412,415 A | 5/1995 | Cook et al. | |

(Continued)

FOREIGN PATENT DOCUMENTS

DE 198 11 910 A1 9/1998

(Continued)

OTHER PUBLICATIONS

U.S. Appl. No. 09/201,484, filed Nov. 30, 1998, Carpenter et al.

(Continued)

*Primary Examiner*—Ngoc Vu
(74) *Attorney, Agent, or Firm*—Klarquist Sparkman, LLP

(57) ABSTRACT

An entertainment head-end provides broadcast programming, video-on-demand services, and HTML-based interactive programming through a distribution network to client terminals in subscribers' homes. A number of different features are provided, including novel user interfaces, enhanced video-on-demand controls, a variety of interactive services (personalized news, jukebox, games, celebrity chat), and techniques that combine to provide user experiences evocative of conventional television.

22 Claims, 3 Drawing Sheets

U.S. PATENT DOCUMENTS

| | | |
|---|---|---|
| 5,453,779 A | 9/1995 | Dan et al. |
| 5,455,570 A | 10/1995 | Cook et al. |
| 5,461,415 A | 10/1995 | Wolf et al. |
| 5,477,263 A | 12/1995 | O'Callaghan et al. |
| 5,491,820 A | 2/1996 | Belove et al. |
| 5,512,935 A | 4/1996 | Majeti et al. |
| 5,512,954 A | 4/1996 | Shintani |
| 5,517,257 A | 5/1996 | Dunn et al. |
| 5,524,272 A | 6/1996 | Podowski et al. |
| 5,526,035 A | 6/1996 | Lappington et al. |
| 5,530,961 A | 6/1996 | Janay et al. |
| 5,534,941 A | 7/1996 | Sie et al. |
| 5,544,354 A | 8/1996 | May et al. |
| 5,550,578 A | 8/1996 | Hoarty et al. |
| 5,553,223 A | 9/1996 | Greenlee et al. |
| 5,554,980 A | 9/1996 | Hashimoto et al. |
| 5,555,244 A | 9/1996 | Gupta et al. |
| 5,557,316 A | 9/1996 | Hoarty et al. |
| 5,585,838 A | 12/1996 | Lawler et al. |
| 5,589,892 A | 12/1996 | Knee et al. |
| 5,589,945 A | 12/1996 | Abecassis |
| 5,592,551 A | 1/1997 | Lett et al. |
| 5,600,364 A | 2/1997 | Hendricks et al. |
| 5,600,368 A | 2/1997 | Matthews, III |
| 5,610,653 A | 3/1997 | Abecassis |
| 5,616,876 A | 4/1997 | Cluts |
| 5,619,247 A | 4/1997 | Russo |
| 5,619,249 A | 4/1997 | Billock et al. |
| 5,621,456 A | 4/1997 | Florin et al. |
| 5,630,204 A | 5/1997 | Hylton et al. |
| 5,648,824 A | 7/1997 | Dunn et al. |
| 5,652,613 A | 7/1997 | Lazarus et al. |
| 5,654,748 A | 8/1997 | Matthews, III |
| 5,657,072 A | 8/1997 | Aristides et al. |
| 5,682,511 A | 10/1997 | Sposato et al. |
| 5,684,799 A | 11/1997 | Bigham et al. |
| 5,687,331 A | 11/1997 | Volk et al. |
| 5,692,214 A | 11/1997 | Levine |
| 5,721,829 A | 2/1998 | Dunn et al. |
| 5,724,091 A | 3/1998 | Freeman et al. |
| 5,727,159 A | 3/1998 | Kikinis et al. |
| 5,729,280 A | 3/1998 | Inoue et al. |
| 5,734,444 A | 3/1998 | Yoshinobu |
| 5,734,589 A | 3/1998 | Kostreski et al. |
| 5,748,499 A | 5/1998 | Trueblood |
| 5,751,282 A | 5/1998 | Girard et al. |
| 5,752,160 A | 5/1998 | Dunn |
| 5,758,257 A | 5/1998 | Herz et al. |
| 5,758,258 A | 5/1998 | Shoff et al. |
| 5,758,259 A | 5/1998 | Lawler |
| 5,768,539 A | 6/1998 | Metz et al. |
| 5,781,228 A | 7/1998 | Sposato |
| 5,790,115 A | 8/1998 | Pleyer et al. |
| 5,797,001 A | 8/1998 | Augenbraun |
| 5,798,785 A | 8/1998 | Hendricks et al. |
| 5,799,017 A | 8/1998 | Gupta et al. |
| 5,801,747 A | 9/1998 | Bedard |
| 5,815,145 A | 9/1998 | Matthews, III |
| 5,816,918 A | 10/1998 | Kelly et al. |
| 5,818,439 A * | 10/1998 | Nagasaka et al. ............ 725/87 |
| 5,818,441 A | 10/1998 | Throckmorton |
| 5,828,370 A | 10/1998 | Moeller et al. |
| 5,835,087 A | 11/1998 | Herz et al. |
| 5,850,218 A | 12/1998 | LaJoie et al. |
| 5,857,190 A | 1/1999 | Brown |
| 5,861,906 A | 1/1999 | Dunn et al. |
| 5,874,985 A | 2/1999 | Matthews |
| 5,883,661 A | 3/1999 | Hoarty |
| 5,886,690 A | 3/1999 | Pond et al. |
| 5,898,387 A | 4/1999 | Davis et al. |
| 5,907,715 A | 5/1999 | Stoel et al. |
| 5,935,004 A | 8/1999 | Tarr et al. |
| 5,937,331 A * | 8/1999 | Kalluri et al. ............... 725/146 |
| 5,959,621 A | 9/1999 | Nawaz et al. |
| 5,959,697 A | 9/1999 | Coleman, Jr. |
| 5,971,849 A | 10/1999 | Falciglia |
| 5,991,799 A * | 11/1999 | Yen et al. .................... 709/218 |
| 6,002,394 A | 12/1999 | Schein et al. |
| 6,005,563 A | 12/1999 | White et al. |
| 6,020,912 A | 2/2000 | De Lang |
| 6,023,731 A | 2/2000 | Chawla |
| 6,025,837 A | 2/2000 | Matthews, III et al. |
| 6,065,042 A | 5/2000 | Reimer et al. |
| 6,075,526 A | 6/2000 | Rothmuller |
| 6,078,348 A | 6/2000 | Klosterman et al. |
| 6,097,441 A | 8/2000 | Allport |
| 6,104,390 A | 8/2000 | Sturgeon et al. |
| 6,118,450 A | 9/2000 | Proehl et al. |
| 6,130,726 A | 10/2000 | Darbee et al. |
| 6,137,539 A | 10/2000 | Lownes et al. |
| 6,141,003 A | 10/2000 | Chor et al. |
| 6,144,376 A | 11/2000 | Connelly |
| 6,151,059 A | 11/2000 | Schein et al. |
| 6,154,771 A | 11/2000 | Rangan et al. |
| 6,177,931 B1 | 1/2001 | Alexander et al. |
| 6,184,877 B1 | 2/2001 | Dodson et al. |
| 6,195,692 B1 | 2/2001 | Hsu |
| 6,201,538 B1 | 3/2001 | Wugofski |
| 6,233,736 B1 | 5/2001 | Wolzien |
| 6,312,336 B1 | 11/2001 | Handelman et al. |
| 6,317,784 B1 | 11/2001 | Mackintosh et al. |
| 6,323,911 B1 | 11/2001 | Schein et al. |
| 6,324,338 B1 | 11/2001 | Wood et al. |
| 6,349,410 B1 | 2/2002 | Lortz |
| 6,363,440 B1 | 3/2002 | Stepp et al. |
| 6,378,130 B1 | 4/2002 | Adams |
| 6,388,714 B1 | 5/2002 | Schein et al. |
| 6,392,664 B1 | 5/2002 | White et al. |
| 6,412,110 B1 | 6/2002 | Schein et al. |
| 6,480,667 B1 | 11/2002 | O'Connor |
| 6,505,240 B1 | 1/2003 | Blumenau |
| 6,571,390 B1 | 5/2003 | Dunn et al. |
| 6,588,015 B1 | 7/2003 | Eyer et al. |
| 6,614,987 B1 | 9/2003 | Ismail et al. |
| 6,628,302 B2 | 9/2003 | White et al. |
| 6,637,029 B1 | 10/2003 | Maissel et al. |
| 6,654,721 B2 | 11/2003 | Handelman |
| 6,704,028 B2 | 3/2004 | Wugofski |
| 6,732,366 B1 | 5/2004 | Russo |
| 6,732,369 B1 | 5/2004 | Schein et al. |
| 6,756,997 B1 | 6/2004 | Ward, III et al. |
| 6,757,691 B1 | 6/2004 | Welsh et al. |
| 6,784,879 B1 * | 8/2004 | Orr ............................. 345/212 |
| 6,973,669 B2 * | 12/2005 | Daniels ...................... 725/112 |
| 7,095,949 B2 | 8/2006 | Okada |
| 2002/0032907 A1 | 3/2002 | Daniels |
| 2002/0100044 A1 | 7/2002 | Daniels |
| 2003/0056216 A1 | 3/2003 | Wugofski et al. |
| 2004/0103439 A1 * | 5/2004 | Macrae et al. ............... 725/109 |
| 2004/0261125 A1 | 12/2004 | Ellis et al. |
| 2005/0039219 A1 | 2/2005 | Cooper et al. |
| 2006/0053460 A1 | 3/2006 | Ramanathan |

FOREIGN PATENT DOCUMENTS

| | | |
|---|---|---|
| EP | 0 123 456 A2 | 10/1984 |
| EP | 0 140 593 A2 | 5/1985 |
| EP | 0 140 593 A3 | 5/1985 |
| EP | 0 277 015 A2 | 8/1988 |
| EP | 0 477 124 A | 3/1992 |
| EP | 0 646 857 A | 4/1995 |
| EP | 0 720 368 A1 | 7/1996 |
| EP | 0 721 283 A2 | 7/1996 |
| EP | 0 782 337 A2 | 7/1997 |

| | | |
|---|---|---|
| EP | 0 782 337 A3 | 7/1997 |
| EP | 0 788 289 A2 | 8/1997 |
| EP | 0 798 899 A1 | 10/1997 |
| EP | 0 811 939 A | 12/1997 |
| EP | 0 845 906 A2 | 6/1998 |
| EP | 0 852 443 A2 | 7/1998 |
| WO | WO 92/10040 | 6/1992 |
| WO | WO 95/15658 | 6/1995 |
| WO | WO 96/17306 | 6/1996 |
| WO | WO 96/17467 | 6/1996 |
| WO | WO 97/03521 | 1/1997 |
| WO | WO 97/24832 | 7/1997 |
| WO | WO 98/00951 A | 1/1998 |
| WO | WO 98/00976 | 1/1998 |
| WO | WO 98/17064 | 4/1998 |
| WO | WO 98/43419 | 10/1998 |
| WO | WO 98/44424 | 10/1998 |
| WO | WO 98/48566 | 10/1998 |

OTHER PUBLICATIONS

Jones, Michael B., "The Microsoft Interactive TV System: An Experience Report," Jul. 1997, Technical Report MSR-TR-97-18, Microsoft Research, Microsoft Corp., 16 pages.

Amazon.com, Mar. 13, 1999, 3 pages.

Ubik S., "Possibilities of Using Protocol Converters for NIR System Construction," Computer Communications Review, U.S. Association for Computing Machinery, New York, vol. 27, No. 2, Apr. 1997, pp. 37-48.

Namihira D. et al., "A Media Proxy Architecture for an NFS-Based VOD Service on the Intranet," IEEE Pacific Rim Conference on Communications, Computers and Signal Processing, U.S., New York, N.Y.: IEEE, vol. Conf. 6, 1997, pp. 97-100.

Gottfried W.R. Luderer et al., "Distributed Multimedia using CORBA," Global Telecommunications Conference (Globecom), U.S., New York, IEEE, 1996, pp. 68-72.

Bellovin S. et al., "Network Firewalls," IEEE Communications Magazine, vol. 32, No. 9, Sep. 1994, pp. 50-57.

Dan A. et al., "Channel Allocation under Batching and VCR Control in Video-On-Demand Systems," Journal of Parallel and Distributed Computing, vol. 30, No. 2, Nov. 1, 1995, pp. 168-179.

De Jong A. et al., "A VoD Application Implemented in Java," Multimedia Tools and Applications, vol. 5, 1997, pp. 161-170.

Kerr G., "A Review of Fully Interactive Video on Demand," Signal Processing Image Communication, vol. 8, No. 3, Apr. 1996, pp. 173-190.

Brooks et al., "Application-Specific Proxy Servers as HTTP Stream Transducers", Internet Citation, XX, XX, Dec. 1, 1995, pp. 1-9, XP002081461.

Fox et al., "Reducing WWW latency and bandwidth requirements by real-time distillation", Computer Networks and ISDN Systems, North Holland Publishing, Amsterdam, NL, vol. 28, No. 11, May 1996, pp. 1445-1456, XP004018241.

European Search Report dated Nov. 5, 2007, Application No. 03012428.3, 3 pages.

* cited by examiner

VIDEO ON DEMAND METHODS AND SYSTEMS

RELATED APPLICATION DATA

This application is a continuation of U.S. patent application Ser. No. 09/870,267 filed May 29, 2001, which is a divisional of U.S. patent application Ser. No. 09/201,495, filed Nov. 30, 1998.

The subject matter of this application is generally related to that disclosed in the following applications:

U.S. patent application Ser. No. 09/201,484, filed Nov. 30, 1998, "Proxy for Video on Demand Server Control", (Bruck et al);

U.S. patent application Ser. No. 09/201,696, filed Nov. 30, 1998, "Method and System for Presenting Television Programming and Interactive Entertainment", (White et al); and U.S. patent application Ser. No. 09/201,699, filed Nov. 30, 1998, "Interactive Video Programming Methods", (White et al).

The subject matter of this application is also generally related to the subject matter of application Ser. No. 09/153,577, filed Sep. 15, 1998, "Television/Internet Terminal User Interface", (Zigmond et al.).

The disclosures of all these related applications are incorporated by reference.

BACKGROUND AND SUMMARY OF THE INVENTION

Interactive video promises to be a major component of future home entertainment systems. One antecedent—hotel video-on-demand systems—illustrates some of the failings of the prior art.

In an exemplary hotel video-on-demand system, a user with a remote control tunes a television to a predetermined channel on which a menu of on-demand video services is presented. The menu typically solicits entry of a two-digit code, such as 30 for comedy movies, 40 for action movies, 50 for children's movies, etc. In response to user entry of a two-digit code, a further menu is presented detailing movies available under the selected category. The user is then prompted to enter a code corresponding to the desired movie (e.g. 51 for Anastasia, 52 for Antz, 53 for Snow White, etc.).

After entry of a movie selection code (and after confirmation of the video charge that will appear on the hotel bill at checkout), the movie begins playing. The movie thereafter plays continuously. If the viewer receives a telephone call, or wishes to tune the television briefly to another channel, there is no provision for interrupting the on-demand video delivery—the viewer simply misses part of the video. In most systems, if the television is tuned to another channel for more than a brief interval, the on-demand video is terminated. If the viewer wishes to continue viewing the video, it must be started again at the beginning, typically incurring another charge.

Various embodiments of the present invention redress these, and related failings of prior art on-demand video systems.

The foregoing and other features and advantages of the present invention will be more readily apparent from the following detailed description, which proceeds with reference to the accompanying drawings.

DETAILED DESCRIPTION

Figure 1:
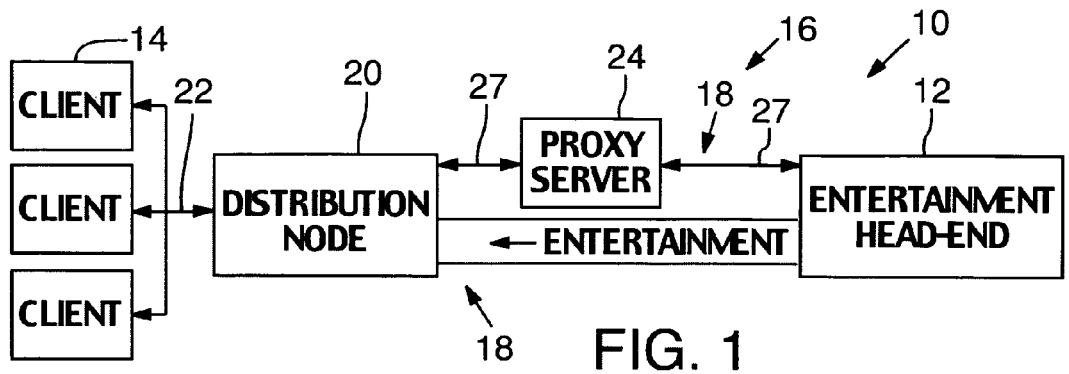
FIG. 1 is a block diagram of an interactive video system that can be used in accordance with the present invention.

Referring to FIG. 1, an exemplary interactive video system 10 includes a entertainment head-end 12 and one or more client terminals 14 intercoupled through a network 16.

The network 16 typically comprises coaxial cable or optical fiber 18, extending from the head-end 12 to distribution nodes 20 within various neighborhoods. From the distribution nodes, further cables 22 couple to individual subscriber premises.

As detailed in the companion application entitled Proxy for Video on Demand Server Control, filed herewith, the network can include one or more proxy servers 24. These are computers interposed between the head-end 12 and the client terminals 14 to perform various system control and user interface (UI) functions.

The proxy server 24 is interposed in a logical TCP/IP control channel 27 between the head-end and clients. While the control signals and the entertainment are physically conveyed on the same cable 18, they are shown separately in FIG. 1 for conceptual clarity.

Figure 2:
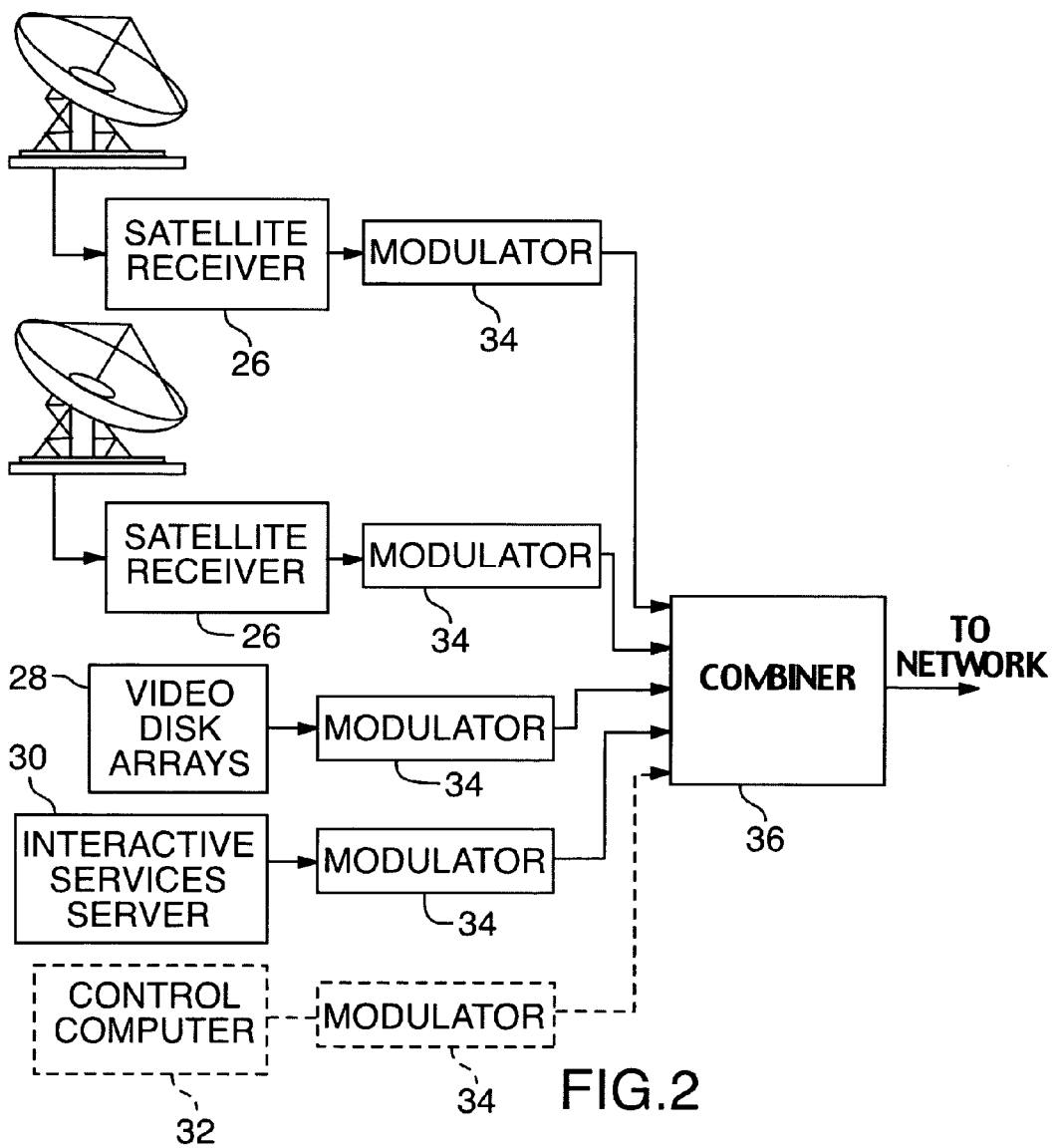
FIG. 2 is a block diagram of the entertainment head-end of FIG. 1.

As shown in FIG. 2, the entertainment head-end 12 includes the components typically associated with a cable television head-end installation, e.g. satellite receivers 26 for receiving satellite broadcasts and producing corresponding baseband analog video signals. Additionally, head-end 12 includes fast digital disk arrays and/or optical storage 28 for storage of MPEG-encoded digital video for on-demand delivery. Head-end 12 also includes one or more interactive services servers 30, which output HTML-based programming (e.g. customized news, celebrity chat, interactive jukebox, and interactive games), as further detailed below. In systems not employing proxy servers 24, the head-end additionally includes a control computer 32 that receives and transmits control data relating to system administration (e.g. channel assignment data, billing information, etc.).

The transmission of these various forms of data from the head-end over the network 16 is straightforward. As is familiar to those skilled in the video arts, the analog video is commonly distributed on 6 MHz channels, beginning at 52 MHz and extending upwardly. The digital video can be encoded on a carrier for transmission within one of these conventional broadcast channels, or can be modulated at one or more other un-used frequencies. Statistical multiplexing is desirably employed to transmit plural channels of digitized video with reduced bandwidth. The HTML-based interactive services and the control data can be transmitted using a conventional protocol (e.g. TCP/IP) and modulated onto a suitable carrier frequency for distribution over the network. Or such data can be transmitted in the vertical blanking interval of analog video broadcasts, as is well known.

After modulation to appropriate distribution frequencies by modulators 34, the various signals from the head-end are combined by an RF combiner 36 for distribution over the network 16.

Figure 3:
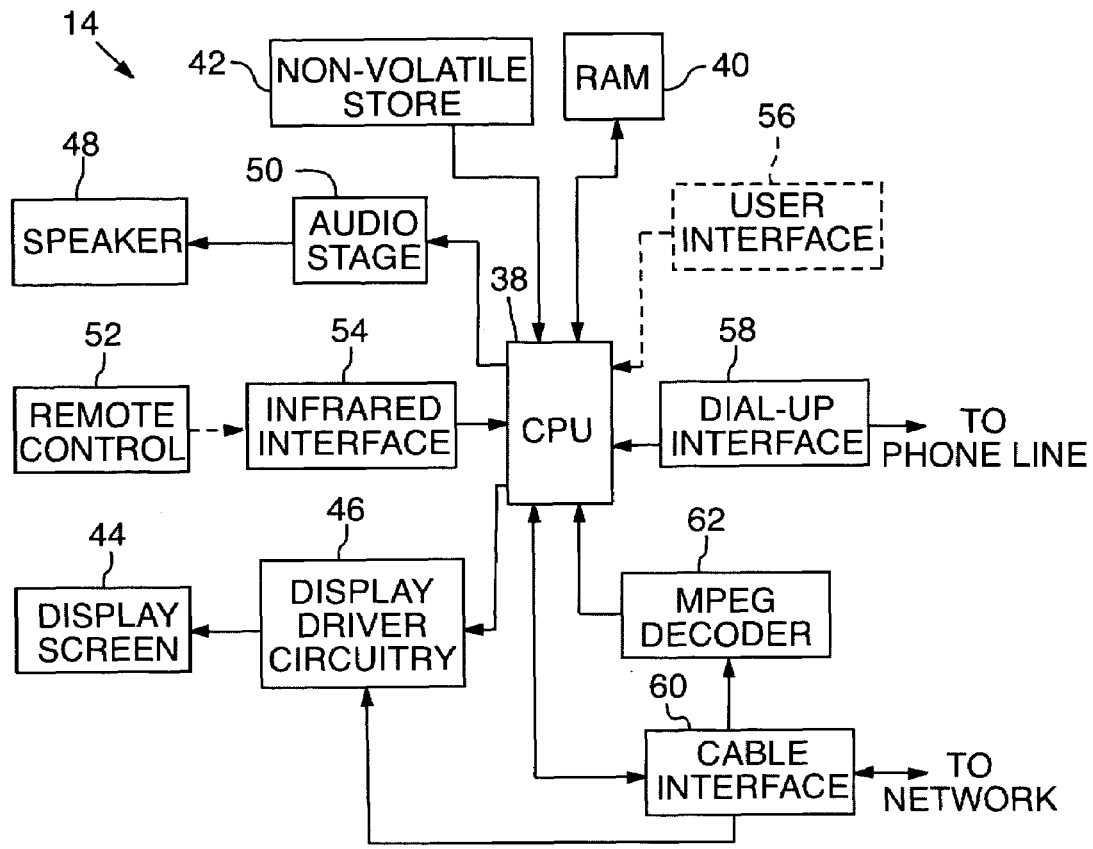
FIG. 3 is a block diagram of a client terminal of FIG. 1.

Each client terminal 14 is an enhanced WebTV terminal that includes a CPU 38, RAM memory 40, non-volatile memory 42, a display screen 44, display driver circuitry 46, a speaker 48 with an associated audio stage 50, a remote control 52, an infrared interface 54, a user interface (UI) 56, a dial-up interface 58, a cable interface 60, and an MPEG decoder 62 (FIG. 3). (The artisan is presumed familiar with WebTV terminals from their many descriptions in the patent and technical literature, and their widespread availability/use.)

The CPU 38 can be any of several microprocessors, e.g. those available from Intel, AMD, Cyrix, Motorola, etc. Alternatively, the CPU can be a custom device that optionally integrates one or more of the other components of terminal 14.

The RAM memory 40 typically comprises 8 or 16K of EDO memory, but more or less memory, and/or memory of differing type, can alternatively be used.

The non-volatile memory 42 in the illustrated embodiment includes a ROM, EEPROM, or flash memory in which certain components of the operating system and applications software are stored. Additionally, the illustrated non-volatile memory 42 includes 4 GB of magnetic disk storage.

Display screen 44 is a CRT of the type conventionally used in consumer televisions, and display driver circuitry 46 serves to provide the excitation signals needed by the CRT, in accordance with input video data provided thereto.

Speaker 48 and audio stage 50 are the audio counterparts to the video display screen and driver circuitry. Desirably, these stages comprise high fidelity speakers and a suitable amplifier, together with audio-synthesis circuitry corresponding to the digital data format by which audio data is transmitted. (For the JUKEBOX service, detailed below, the audio may be transmitted in the MPC3 format, in which case the MPEG decoder 62 may be employed for decoding.)

Remote control 52, and corresponding IR interface 54, are generally conventional, and serve to relay user commands to the terminal in accordance with user manipulation of buttons on the remote control 52.

The dial-up interface 58 in the illustrated embodiment is a modem, coupled to a telephone line. Various different modems and communication links can be used.

The cable interface 60 receives composite data signals from the network 16 and separates them into three general signal types: analog video (typically corresponding to broadcast television programming), digital video (typically corresponding to on-demand video programming), and HTML/control instructions (the former typically corresponding to other interactive services, the latter being instructions exchanged between the client terminal 14 and the head-end 12, a proxy server 24, or a neighborhood node 20). Included in the cable interface 60 is an RF tuner section controlled by the CPU. The illustrated MPEG decoder 62 is an application-specific integrated circuit that converts the MPEG video stream into successive frames of video data.

The user interface 56 in the illustrated embodiment refers to various on-screen visual displays through which—in conjunction with the remote control 52—the user can effect various choices. One of these is switching viewing channels. (As detailed below, switching viewing channels does not necessarily effect a corresponding retuning of the RF tuner portion of the cable interface 60.) Although illustrated separately for clarity, those skilled in the art will understand that the user interface 56 is typically realized as instructions stored in RAM memory 40

The operation of the system is first described with reference to the video-on-demand service. To view an on-demand video, the user first tunes the client terminal 14 to a predetermined channel, the "VIDEO channel."

Here a distinction should be drawn between two types of "channels." The first, termed a "transmission channel," refers to an actual frequency channel (e.g. 52-58 MHz) that is used to relay programming from the head-end 12 to the client terminal 14 over the network 16. The second, termed a "viewer channel," refers to the moniker (e.g. MSNBC, CNN, GAME, CHAT, VIDEO, FAVORITES) by which a user distinguishes different programming. The mapping between viewer and transmission channels is determined by the system (e.g. by the terminal 14, the head-end 12, or a proxy server 24).

The VIDEO channel is a viewer channel—it is the channel to which the viewer switches to receive video on demand programming. The frequency over which this programming is delivered is not important to the viewer. Different transmission channels may be available for use at different times, depending system resource usage (e.g. other viewers' video-on-demand usage). One day the 108-114 MHz transmission channel might be used to relay on-demand video to a subscriber. The next day, the 114-120 MHz transmission channel might be used instead. Data indicating the assignment of transmission channels-to-viewer channels is periodically relayed as control data among the components of the system 10.

Figure 4:
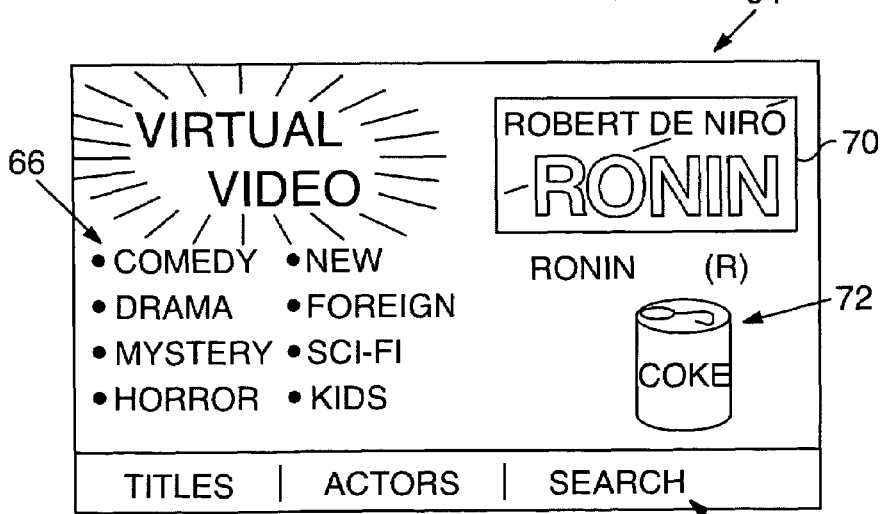
FIG. 4 is an illustration of a video-on-demand selection screen.

On the VIDEO channel, the user is presented an introductory UI screen 64 of the sort shown in FIG. 4. This screen includes four components: a topical listing of movie categories 66; a feature 68 permitting the user to search a database of available videos by title, actor, director, keywords, etc; a promotion 70 of one of more featured video titles; and other advertising 72. This screen is defined by HTML primitives sent over the network 16, as rendered by the client terminal 14. In the illustrated embodiment, the HTML primitives associated with the video selection screen 64 are sent from the proxy server 24.

The viewer manipulates arrow keys on the remote control 52 to highlight the feature of interest, e.g. a particular topical category. (Highlighting here refers to a visual indicia showing that a particular screen feature, or hyperlink, has been selected for execution. Various forms of highlighting can be used, e.g. a change in color of the feature, a colored box surrounding the feature, etc.) After a desired feature has been selected, a "Go" button on the remote control is pressed, signaling the user's selection to the terminal 14.

If the "KIDS" category was highlighted, the system next presents a screen listing available children's movies (again defined by HTML from the proxy server). Again, the viewer manipulates the remote control to select a particular choice, and then presses "Go." At this point, an optional screen can be presented confirming billing arrangements (if any).

Once a final video selection has been made, a video control panel UI 74 (FIG. 5) is presented on the screen. In the illustrated embodiment, this panel is translucent, permitting the viewer to perceive imagery "behind" the overlaid panel. (That is, the panel is rendered as a change in luminance of the underlying imagery.) The exemplary video control panel 74 of FIG. 5 includes PLAY, STOP, REWIND, FAST FORWARD, and PAUSE buttons 76A-E. (Additionally, the panel can have a textual or graphical indication 78 of the time remaining in the selected video.) The PLAY button is initially highlighted.

While the control panel is being rendered at the client (from HTML primitives stored in the non-volatile memory 42), the head-end queues the selected MPEG video for playback, and the system (either the head-end 12 or a proxy server 24) selects an available transmission channel. Data indicating the selected channel is relayed to the client terminal 14, which tunes the RF tuner in the cable interface 60 without any user action. The viewer channel, in contrast, remains unchanged at the VIDEO channel.

To play the selected video, the user simply presses the "Go" button on the remote control 52, activating the initially-highlighted PLAY button 76A on the control panel 74. A corresponding instruction is sent to the head-end 12, and video delivery commences. The on-screen video control panel 74 disappears.

If, during playback, the user wishes to stop or pause delivery of the on-demand video (e.g. to answer the telephone, or get a snack from the kitchen), a "Menu" button on the remote control is pressed. The video control panel 74 reappears, this time with the STOP button highlighted. If the user wishes to stop playback, the "Go" button on the remote is pressed. If the user wishes to pause playback, the highlighting on the control panel is moved to the PAUSE button using arrow keys on the remote control, and the "Go" button is then pressed. A corresponding stop or pause instruction is then sent to the head-end 12 from the client terminal 14, interrupting MPEG delivery.

A data record is stored—either at the client, at the head-end, or at a proxy server—indicating the point of video interruption (e.g. by SMPTE code, disk address, time offset, etc.) so that playback can be resumed from that point (or shortly before that point, to provide context).

When either the STOP or PAUSE button is activated on the panel 74, the panel 74 persists on the screen, but the highlighting is switched back to PLAY. (If the PAUSE button is used to resume playback following a pause instruction, and the user activates the PAUSE button to interrupt the video, the highlighting can remain at the PAUSE button.) This arrangement permits the viewer to resume playback simply by pressing "Go" on the remote, since the button that resumes playback is already highlighted. (The panel similarly persists on-screen if the REWIND or FAST FORWARD buttons is activated, with PLAY next highlighted.)

The screen can be put to various uses while the video is interrupted. Examples include presentation of quizzes and other entertainment to viewers who may still be in the viewing room. An indication of waiting email, or commercial or promotional messages, can similarly be presented.

If the stop in playback is brief, the system 10 maintains the assignment of the transmission channel to that video on demand client 14, despite the interruption in video delivery. However, if the interruption period exceeds a threshold value (e.g. ten minutes), the system returns the assigned transmission channel back to the system's pool of available transmission channels. The channel may then be assigned to another use. If the user thereafter resumes playback by pressing "Go" on the remote (PLAY was already highlighted), the system responds by dynamically assigning a new transmission channel, retuning the client's RF tuner and the head-end's modulator accordingly, and resuming playback from (or just before) the point of interruption.

A similar sequence occurs if the user changes to another viewer channel during playback of an on-demand video (e.g. changing to MSNBC to check a sports score). The system interrupts delivery of the on-demand video (e.g. in response to an instruction or notification sent by the client), and a record indicating the point of MPEG interruption is stored. If the user returns to the VIDEO viewer channel within a predetermined period (e.g. 24 hours), the system resumes transmission of the video from the point of interruption. (No user action, e.g. pressing PLAY, is required—no video control panel is presented in this scenario.) Again, the resumed transmission may occur over a different transmission channel, but this detail is transparent to the user.

The illustrated system includes an electronic program guide that can be selectively displayed on-screen to facilitate viewer program selection. Electronic program guides are familiar to those skilled in the art, so are not belabored here. Exemplary program guides are shown, e.g., in U.S. patents and allowed applications U.S. Pat. Nos. 5,815, 5,758,258, 5,585,838, 5,654,748, 5,526,036, Ser. Nos. 08/969,979 and 08/968,386 (the disclosures of which are incorporated by reference). Desirably, when an on-demand video is selected, the title of the video appears in the electronic program guide, in association with the VIDEO viewer channel. Additionally, an indication of the time-remaining in the selected video can also be displayed, e.g. as a numeric hour:minute representation, or as a block that extends in a gridded program guide for a distance corresponding to the remaining time. (Data specifying the selected video title and the remaining time is stored in one or more of the components of system 10 and can be inserted into the program guide as appropriate.)

This listing of an on-demand video amidst broadcast television programming in an electronic program guide contributes to user perception of on-demand video as just another channel. It is desirable to present all video services in this television-like paradigm so as to present a seamless, familiar experience to new users.

Providing a television-like interaction for on-demand video is one thing; extending that experience to HTML-based video services is another. In the following discussion, several different HTML-based services are described. Various techniques are employed in such services to contribute to a television-like experience.

One technique is to make the screen look like a television screen. Computer displays typically have an image area bounded by straight edges. Since the edge of the CRT tube is typically not straight but is slightly curved, there is commonly a thin black margin at some or all of the edges of computer monitors. The display does not extend into this marginal area lest it render another part of the image off-screen. Television displays, in contrast, are not so concerned with rendering accuracy. Instead, the emphasis is on providing the largest apparent image size. Accordingly, the screen is typically overscanned—with at least certain scan line ends extending beyond the visible portion of the screen. Accordingly, one technique to yield a more television-like experience when displaying HTML-rendered graphics is to deliberately overscan the screen.

A related technique is to avoid displays that are larger than the viewing screen. Many "pages" on the world wide web require "scrolling" to view portions extending off the bottom of the screen. While this is a familiar operation for web-surfers, it is wholly foreign to television viewers and is desirably avoided.

Another technique for enhancing the television-like appearance of HTML graphics is to employ production techniques and values evocative of television programming. For example, fades, dissolves, and wipes are video transition effects that viewers routinely encounter in television programming. However, they are used rarely—if at all—in HTML productions. Their use in the interactive services detailed below contributes to a television-like experience.

Yet another integrating technique is to list the interactive services (e.g. GAMES, CELEBRITY CHAT, JUKEBOX, NEWS) in the system's electronic program guide simply as additional channels, amidst the other channels familiar to viewers (e.g. network broadcast channels and cable channels).

By techniques such as these, viewers encounter interactive video entertainment and conventional television programming in a seamless, familiar context. This is important because, as will be evident from the following discussion, interactive video entertainment itself can be quite different from conventional TV.

Interactive entertainment encompasses a wide range of content. Some forms have antecedents in other contexts or media. Other forms are wholly new. A few examples will serve to illustrate the wide range of possibilities.

A first exemplary interactive video service is a jukebox. When a user first switches to the JUKEBOX viewer channel, a user interface akin to the video selection UI 74 is presented on-screen. However, instead of permitting selection of movies, it permits selection of music (e.g. by genre, artist, title, etc.). Selected music can then be played through the terminal's audio speakers 48 using similar procedures and playback UI as detailed earlier for playback of on-demand video. As before, if the user switches away from the JUKEBOX viewer channel, playback of the selected audio is interrupted and a pointer is stored indicating the point at which the selection should be resumed.

During playback, rather than let the display screen 44 sit idle, it is desirably used in conjunction with the selected music. It may, for example, present a music video to accompany the selected audio recording. Or it may present information related to the selection, e.g. artist biography, critic reviews, listings of other recordings of the same selection by different artists, the artist's upcoming concert schedule, etc. It may also allow the user to purchase the music, whether on CD or otherwise. (All such options can be hot-linked to other screens of HTML data, as is conventional on the world wide web.)

Desirably, the system monitors the user's musical selections, and automatically compiles a profile of the user's preferences (e.g. by genre, artist, etc.). Alternatively, the user can explicitly define his or her preferences. (As with other data stored in distributed system 10, the user's jukebox preferences can be stored in the client terminal, at a proxy server, or at the head-end, or distributed therebetween.) When the user thereafter returns to the JUKEBOX viewer channel, a selection menu configured to focus on these preferences can be presented. (The focused selection menu also includes the option of returning to the general, all-encompassing music selection screen.)

A second exemplary interactive service is NEWS. This viewer channel delivers personalized news information in a television-like format. The channel is organized like CNN Headline News, with a small number of news categories that are continuously cycled-through several times an hour. Categories can include, e.g., headlines, sports, weather, traffic, and financial. The presentations in each category can be static (e.g. text articles), but more typically include streaming video excerpts.

Figure 6:
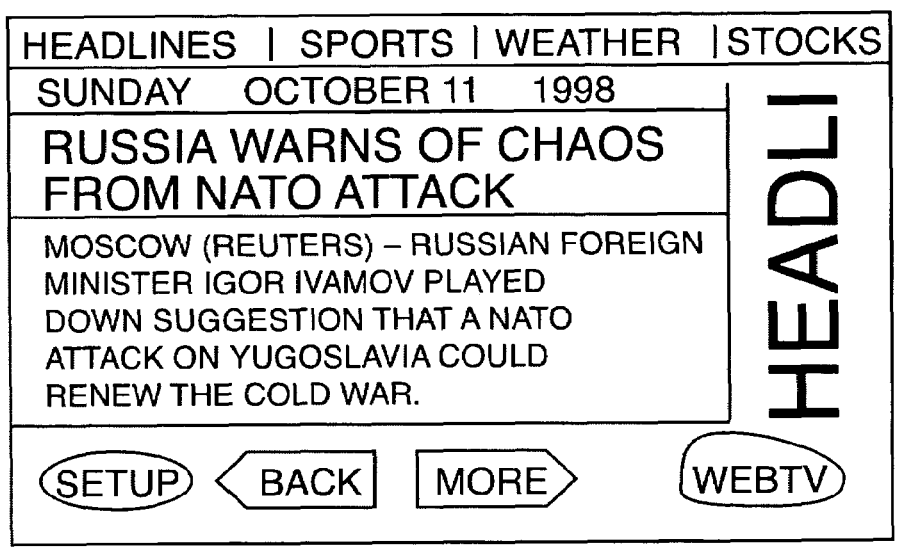
FIG. 6 is an illustration of a screen display on a NEWS viewer channel.

An exemplary presentation of NEWS is shown in FIG. 6. In addition to showing part of the current Headline category, the screen 80 gives the user the option of switching immediately to any other category (sports, weather, or stocks in the illustrated screen). Again, such selection is made by the user with arrow keys on the remote control, by moving highlighting to the desired choice and pressing the "Go" button.

As with the JUKEBOX channel, the NEWS channel allows the viewer to define and store personal news preferences (e.g. a selected ticker of stock prices, Chicago Cubs news, weather for Chicago, etc.). If local client disk storage permits, all news is downloaded and stored, in a FIFO basis, in disk storage allocated thereto. This locally-stored news is then filtered in accordance with the viewer's preferences for display. This arrangement allows the user to change preferences and apply the new preferences to recently downloaded news.

As in the earlier-described embodiments, state data indicating the status of the NEWS channel can be stored whenever the user switches to another viewer channel, so that the NEWS channel can resume at the point of interruption.

A third illustrated interactive channel is CELEBRITY CHAT. This viewer channel presents different celebrities with which participants can chat in a moderated dialog. The celebrities are scheduled at specific times, much like conventional TV talks shows.

In the illustrated arrangement, viewers compose typed questions on a keyboard optionally provided with the client terminal, and send them e-mail fashion to a moderator of the CELEBRITY CHAT channel. The moderator (human or automated) selects questions of widespread appeal and poses them to the celebrity. The posed questions, and the celebrity's responses, are distributed to all viewers of the CELEBRITY CHAT channel over the cable network. (By this arrangement, the dial-up telephone link is activated only briefly—when the user-composed question is emailed to the moderator—saving dial-up charges.)

Figure 7:
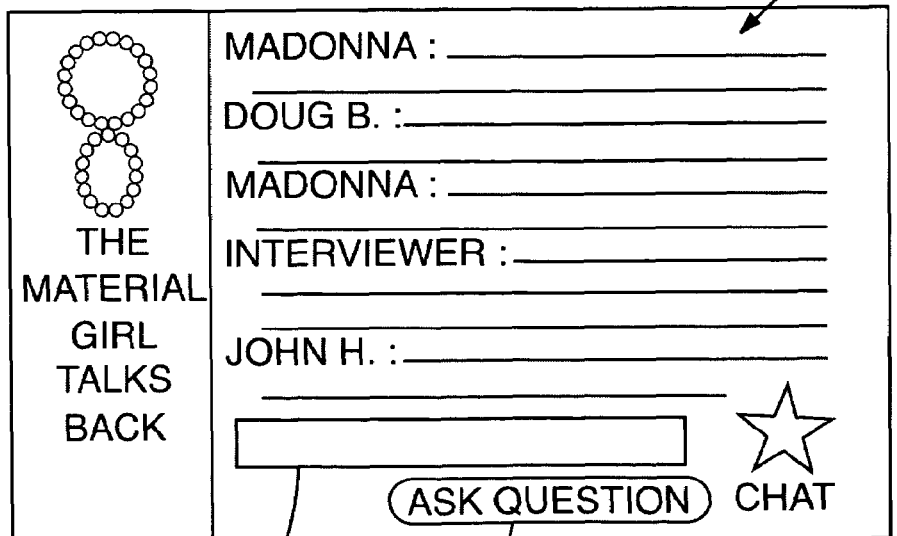
FIG. 7 is an illustration of a screen display on a CELEBRITY CHAT viewer channel.

A user interface 82 associated with the CELEBRITY CHAT channel is shown in FIG. 7. In this embodiment, the chat is presented in typed form. (In other embodiments, of course, streaming audio/video can be employed to present the moderator and the celebrity in their dialog. This can be supplemented by other textual or multi-media presentations related to the celebrity, e.g. music video, movie clips, biographical data, etc.) At the bottom of the screen is an Ask Question feature 84 that can be activated (as before, with arrow keys and the "Go" button on the remote control) to permit entry of the e-mail question in a box 86. After typing the question, the user hits Return on the keyboard. This terminates entry of the question, and activates the dial-up connection through which the question is transmitted to the moderator. After the question has been transmitted, the dial-up link is automatically terminated. If the viewer's question is selected by the moderator, it will eventually appear in the typed transcript of the interview—together with the celebrity's response.

Due to the involvement of other viewers in the CELEBRITY CHAT channel, it is difficult to suspend the state of the channel if the viewer switches to another channel and later returns. In the illustrated embodiment, a viewer returning to the CELEBRITY CHAT channel sees only the last screenful of question-and-answer dialog.

A fourth interactive channel is GAMES. A viewer tuning to this channel is presented with a menu of game options—typically topically arranged. Some games are single player. Other games involve a community of players who are participating in the game. The latter are typically scheduled at prearranged times like television programs (e.g. Dungeons and Dragons, 9:00 p.m. every evening).

Contests and tournaments can be conducted on the GAMES channel, with sponsors awarding prizes (e.g. a free month of WebTV) to high-scorers—either of a single session or over a given period (e.g. a month).

Some games may require execution of software applets on the client terminals, rather than just the rendering of HTML primitives. Such software can be downloaded to the terminal as necessary, or just in advance of scheduled multi-player games. Since some games require relatively large blocks of instructions or data on relatively short notice (depending on the turn of events in the game), same is desirably downloaded in anticipation of likely use, rather than when needed.

If the selected game is of the single-player variety, then state data memorializing the status of the game can be stored if the viewer turns to another channel. When the viewer thereafter returns to the GAMES channel, the game can be resumed at the point of interruption. (Again, due to the involvement of other participants in multi-player games, it is generally impractical to try and permit the viewer to resume an interrupted multi-player game at the point of interruption.)

Figure 5:
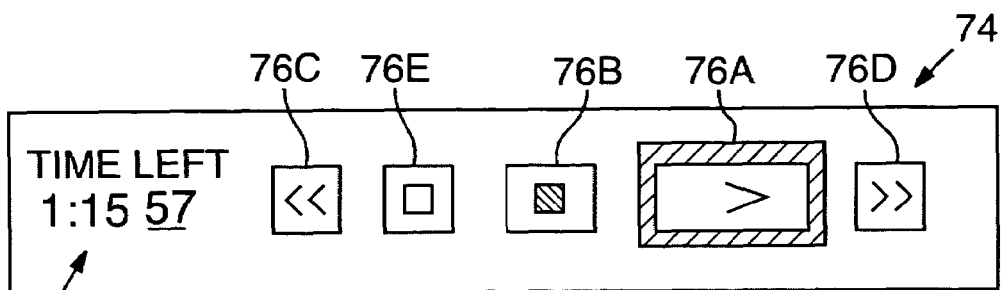
FIG. 5 is an illustration of a user interface permitting a user to control playback of an on-demand video.

A further feature of the illustrated client terminal is to automatically record favorite broadcast television programs. The client monitors the user's viewing habits to determine favorite shows (e.g. StarTrek Voyager, Wednesdays, 6:00 p.m., viewer channel FOX). Thereafter, if the terminal is not activated by the user to watch one of these favorites, the terminal notices the event and automatically copies the program onto disk, to the extent storage space permits. (MPEG compression—either software-based, or employing a dedicated MPEG compressor ASIC—is typically employed.) This stored program is then listed by title and length in the electronic program guide, as available for viewing on the FAVORITES channel. If the viewer switches to this channel, the recorded program is played back automatically. The playback UI of FIG. 5 is selectively presented (e.g. by pressing the Menu button on the remote control) to allow the viewer to control playback. If several favorite programs have been stored, the viewer is first presented with a menu screen on the FAVORITES channel by which the desired program can be selected.

Recorded programs are not deleted after viewing. However, their storage space may be overwritten by other recordings. Recorded programs that have not been viewed are overwritten as needed, oldest first. Viewed programs are overwritten before non-viewed programs. (Programming implementing a variety of more complex rules and policies is typically provided to govern which recorded programs are deleted to provide storage for new programs.)

Video storage at the client terminal also permits a viewer to take a break from broadcast programming without missing anything (as would otherwise occur). When a viewer wants to take a break, a Delay Program button is selected from an Options menu that is controllably presented on the screen in response to a button on the remote control. When the Delay Program button is activated, the then-tuned program is routed to the MPEG compressor and copied to disk. When the viewer thereafter returns, the viewer activates a Resume Program button on the Options menu. Copying of the incoming broadcast continues, but simultaneous playback of the earlier recorded portion commences and is displayed on the screen. The disk thus acts as a circular buffer.

Yet another feature of the illustrated embodiment is an arrangement by which the system can suggest programming that may be enjoyed by different users. The system compiles profiles of each user's viewing habits (e.g. Viewer A's favorite shows appear to be (a) 60 Minutes, (b) StarTrek Voyager, and (c) Dharma and Greg; the profile includes less-frequently viewed programs as well). Each such profile is correlated with other viewers' profiles to find affinity groupings of users with similar profiles. Viewing suggestions can then be made based on the system's determination of other programming that is popular among other members of the group. For example, from an analysis of the profiles of viewers most closely correlated with Viewer A, the system may note that a significant number also watches Third Rock From the Sun. System records may show that Viewer A has never watched this program and the system may thus propose (either in response to a viewer's query or autonomously) that Viewer A may enjoy Third Rock From the Sun.

Desirably, the profiles are based on more than a single favorite program for each viewer. Although a single favorite program could serve as the basis for affinity grouping, this is generally too clumsy a metric (e.g. many viewers of Seinfeld have otherwise divergent viewing preferences).

The profiles need not be based on favorite programming alone. Many other factors can be considered in forming affinity groupings, e.g. time-of-day viewing habits, zip code, game/chat/interactive news/jukebox preferences/habits, etc.

From the foregoing it will be recognized that the illustrated system redresses many shortcomings of the prior art, and provides a great number of features not previously available.

Having described and illustrated the principles of our invention with reference to a preferred embodiment and various alternatives, it should be apparent that the invention is not limited to the detailed arrangements.

For example, while the disclosure particularly considered use of visual user-interfaces, many of the principles detailed above can be applied equally-well to user interfaces employing other techniques, e.g. gesture-interfaces, audio interfaces, tactile interfaces, etc.

Similarly, while the detailed embodiment employed certain UI conventions (e.g. the video control panel disappears after PLAY is activated), other embodiments can employ other UI conventions (e.g. the control panel persists, or is minimized, or becomes more transparent, etc.)

Several references were made to HTML. This term is meant to include not just Hypertext Markup Language per se, but also to encompass other graphical and/or video representation systems by which primitives can be combined to yield desired static or moving displays.

The illustrated embodiment employed a wired link to the interactive network, but other distribution arrangements (e.g. direct satellite broadcast, with telephone return channel) can likewise by used. Similarly, the dial-up link is not exclusive; other arrangements (e.g. MetroCOM, etc.) can be used, depending on the needs of the particular application.

Moreover, even a "wired" link to the interactive network needn't be of the sort particularly illustrated. With enhanced compression techniques and delivery technologies, other arrangements—including plain old telephone service—can alternatively be employed.

To provide a comprehensive disclosure without unduly lengthening this specification, applicants incorporate by reference the disclosure of patent U.S. Pat. No. 5,648,824, which discloses additional details related to video-on-demand systems and related user interfaces.

While the foregoing discussion has detailed a complete system, it employs many inventive concepts—each of which is believed patentable apart from the system as a whole.

In view of the many different embodiments to which the above-described inventive concepts may be applied, it should be recognized that the detailed embodiments are illustrative only and should not be taken as limiting the scope of our invention. Rather, we claim as our invention all such modifications as come within the scope and spirit of the following claims, and equivalents thereto.

We claim:

1. A method of presenting entertainment comprising:
   receiving video signals;
   displaying the received video signals;
   receiving a request from a user to pause display of the received video signals;
   in response to the request, resumably interrupting display of the received video signals;
   during the resumably interrupting display of the received video signals, displaying an indication of an e-mail message waiting;
   removing a control panel from a screen if a first control on the control panel is selected and maintaining the control panel on the screen if a second control on the control panel is selected; wherein the control panel comprises the first control and the second control;
   wherein the second control is a PAUSE button;
   wherein the first control is a PLAY button;
   upon receiving an indication that the PAUSE button was selected, highlighting the PLAY button; and
   upon receiving an indication that the highlighted PLAY button was selected, resuming display of the received video signal.

2. The method of claim 1 wherein after receiving the request to pause display of the received video signals, a data record is stored at a head-end indicating a point of interruption of the received video signals.

3. The method of claim 1 wherein after receiving the request to pause display of the received video signals, a data record is stored at a proxy server indicating a point of interruption of the received video signals.

4. The method of claim 1 wherein after receiving the request to pause display of the received video signals, a data record is stored in memory indicating a point of interruption of the received video signals.

5. The method of claim 4 wherein the received video signals are recorded during the interruption.

6. A method of presenting entertainment comprising:
   receiving video signals;
   displaying the received video signals;
   receiving a request from a user to pause display of the received video signals;
   in response to the request, resumably interrupting display of the received video signals;
   during the resumably interrupting display of the received video signals displaying an indication of a message waiting;
   removing a control panel from a screen if a first on-screen control is actuated;
   maintaining the control panel on the screen if a second on-screen control is actuated wherein the control panel comprises the first on-screen control and the second on-screen control; wherein the second on-screen control is a PAUSE button;
   wherein the first on-screen control is a PLAY button;
   upon receiving an indication that the PAUSE button was selected, highlighting the PLAY button; and
   upon receiving an indication that the highlighted PLAY button was selected, resuming display of the received video signals.

7. The method of claim 6 wherein said resumed display of the received video signals is received on a different transmission channel.

8. The method of claim 6 wherein the message is a chat message.

9. The method of claim 6 wherein the message is an electronic mail message.

10. The method of claim 6 wherein the message is a promotional message.

11. The method of claim 6 wherein the message is a commercial message.

12. A computer readable medium encoded with computer executable instructions comprising instructions for performing the method of claim 6.

13. A system for providing entertainment, the system comprising:
   a display;
   a remote control;
   a digital processor;
   volatile and non-volatile memory; and
   digital processor executable instructions stored in memory for performing a method comprising,
   displaying received video entertainment;
   receiving a request from a user to pause display of the received video entertainment;
   in response to the request, resumably interrupting display of the received video entertainment;
   displaying an indication of waiting e-mail while the display of the received video entertainment is resumably interrupted;
   removing a control panel from a screen if a first control on the control panel is selected and maintaining the control panel on the screen if a second control on the control panel is selected; wherein the control panel comprises the first control and the second control;
   wherein the second control is a PAUSE button;
   wherein the first control is a PLAY button;
   upon receiving an indication that the PAUSE button was selected, highlighting the PLAY button; and
   upon receiving an indication that the highlighted PLAY button was selected, resuming display of the received video signal.

14. The system of claim 13 wherein after receiving the request, a pause instruction is sent out on a network connection and a data record is stored at a head-end indicating a point of MPEG interruption.

15. The system of claim 13 wherein after receiving the request, a pause instruction is sent out on a network connection and a data record is stored at a proxy server indicating a point of MPEG interruption.

16. The system of claim 13 wherein after receiving the request, a data record is stored in memory indicating a point of display interruption.

17. The system of claim 13 further comprising resuming display of the received video entertainment.

18. The system of claim 13 wherein the displayed received video entertainment is received on a transmission channel demodulated from a composite signal.

19. A system for providing entertainment, the system comprising:
   a display;
   a remote control;
   a digital processor;
   volatile and non-volatile memory; and
   digital processor executable instructions stored in memory for performing a method comprising:

displaying received video entertainment;

receiving a request from a user to pause display of the received video entertainment;

in response to the request, resumably interrupting display of the received video entertainment;

displaying an indication of waiting e-mail while the display of the received video entertainment is resumably interrupted;

removing a control panel from a screen if a first control on the control panel is selected and maintaining the control panel on the screen if a second control on the control panel is selected; wherein the control panel comprises the first control and the second control;

wherein the second control is a PAUSE button;

wherein the first on-screen control is a PLAY button;

upon receiving an indication that the PAUSE button was selected, highlighting the PLAY button; and upon receiving an indication that the highlighted PLAY button was selected, resuming display of the received video signal.

20. A computer readable medium encoded with computer readable instructions comprising instructions for performing a method comprising:

receiving a composite signal comprising plural channels of programming;

displaying video programming;

receiving a request from a user to delay video programming display;

resumably interrupting display of video programming responsive to the request;

while the video programming display is resumably interrupted, displaying an indication of a waiting e-mail message;

removing a control panel from a screen if a first control on the control panel is selected and maintaining the control panel on the screen if a second control on the control panel is selected; wherein the control panel comprises the first control and the second control;

wherein the second control is a PAUSE button;

wherein the first control is a PLAY button;

upon receiving an indication that the PAUSE button was selected, highlighting the PLAY button; and upon receiving an indication that the highlighted PLAY button was selected, resuming display of the received video signal.

21. The computer readable medium encoded with computer executable instructions for performing the method of claim 18 wherein in response to the request to delay video programming, a data record is stored at a proxy server indicating a point of video programming interruption.

22. The computer readable medium encoded with computer executable instructions for performing the method of claim 18 wherein in response to the request to delay video programming, a data record is stored in memory indicating a point of video programming interruption.

* * * * *